US012671321B2

(12) United States Patent
Luo et al.

(10) Patent No.: US 12,671,321 B2
(45) Date of Patent: Jun. 30, 2026

(54) VOLTAGE CONVERSION SYSTEM INCLUDING A DOUBLE-SIDED DIRECT CURRENT-LINK CAPACITOR SYSTEM

(71) Applicant: GM GLOBAL TECHNOLOGY OPERATIONS LLC, Detroit, MI (US)

(72) Inventors: Yilun Luo, Ann Arbor, MI (US); Chandra S. Namuduri, Troy, MI (US); Kenneth J. Shoemaker, Highland, MI (US); Sanjeev M. Naik, Troy, MI (US); Dongxu Li, Troy, MI (US); Junghoon Kim, Carlisle, OH (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 213 days.

(21) Appl. No.: 18/753,893

(22) Filed: Jun. 25, 2024

(65) Prior Publication Data

US 2025/0392209 A1     Dec. 25, 2025

(51) Int. Cl.
| | |
|---|---|
| *H02M 1/44* | (2007.01) |
| *H02G 5/02* | (2006.01) |
| *H02M 7/00* | (2006.01) |

(52) U.S. Cl.
CPC ............... *H02M 1/44* (2013.01); *H02G 5/02* (2013.01)

(58) Field of Classification Search
CPC .......... H02M 7/003; H02M 1/44; H02G 5/02
See application file for complete search history.

(56) References Cited

U.S. PATENT DOCUMENTS

| | | | | |
|---|---|---|---|---|
| 11,374,504 | B2 * | 6/2022 | Yabuuchi | ............ H02M 7/5387 |
| 2018/0152098 | A1 * | 5/2018 | Shin | ....................... H02M 7/003 |
| 2021/0319956 | A1 * | 10/2021 | Houda | ................... H01G 4/228 |
| 2022/0385164 | A1 * | 12/2022 | Koyanagi | ............. H02M 3/156 |
| 2024/0113637 | A1 * | 4/2024 | Hartwig | .............. H02M 7/4837 |
| 2024/0297576 | A1 * | 9/2024 | Zhan | ....................... H02M 1/32 |

FOREIGN PATENT DOCUMENTS

| | | | |
|---|---|---|---|
| DE | 102021200628 | A1 | 7/2022 |
| JP | 2002119069 | A | 4/2002 |
| JP | 2004056984 | A | 2/2004 |
| JP | 2006019367 | A | 1/2006 |
| JP | 2007006571 | A * | 1/2007 |
| JP | 2020102941 | A * | 7/2020 |

* cited by examiner

*Primary Examiner* — Sisay G Tiku
(74) *Attorney, Agent, or Firm* — Ingrassia Fisher & Lorenz, LLP | IF&L

(57)          ABSTRACT
Voltage conversion systems including double-sided (direct current) DC-link capacitor systems are provided. The voltage conversion system includes a voltage conversion circuit and a double-sided DC-link capacitor system electrically coupled to the voltage conversion circuit. The double-sided DC-link capacitor system includes a busbar system, a first capacitor unit disposed on a first side of the busbar system and electrically coupled to the busbar system, and a second capacitor unit disposed on a second side of the busbar system and electrically coupled to the busbar system. The second side of the busbar system is opposite the first side of the busbar system. A current flow through the busbar system flows to the first capacitor unit in a first current flow direction and to the second capacitor unit in a second current flow direction. The second current flow direction is opposite the first current flow direction.

20 Claims, 8 Drawing Sheets

VOLTAGE CONVERSION SYSTEM INCLUDING A DOUBLE-SIDED DIRECT CURRENT-LINK CAPACITOR SYSTEM

INTRODUCTION

The technical field generally relates to vehicles, and more particularly relates to a voltage conversion system including a double-sided direct current (DC)-link capacitor system.

Most electric motors include voltage conversion systems. Voltage conversion systems have an inherent power loop in which high levels of current flow from a direct current (DC)-link capacitor to high side power modules, to low side power modules, and back. This power loop generates magnetic fields that form parasitic inductance. Wide bandgap (WBG) inverters, often used in electric vehicles, have faster switching levels where the presence of low amounts of parasitic inductance can lead to high voltage overshoots and/or generate high levels of electromagnetic interference (EMI), ringing, bearing currents, and switching losses that can impact voltage conversion system and/or motor performance.

The DC-link capacitor typically includes multiple capacitors, they are often connected in a single sided arrangement. This arrangement of capacitors can contribute to parasitic inductance levels during voltage conversion system operations.

Accordingly, it is desirable to provide a voltage conversion system including a double-sided DC-link capacitor system. Other desirable features and characteristics will become apparent from the subsequent detailed description and the appended claims, taken in conjunction with the accompanying drawings and the foregoing technical field and background.

SUMMARY

A voltage conversion system including a double-sided direct current (DC)-link capacitor system includes a voltage conversion circuit electrically coupled to the double-sided DC-link capacitor system. The double-sided DC-link capacitor system includes a busbar system; a first capacitor unit disposed on a first side of the busbar system and electrically coupled to the busbar system; and a second capacitor unit disposed on a second side of the busbar system and electrically coupled to the busbar system, the second side of the busbar system being opposite the first side of the busbar system, wherein a current flow through the busbar system flows to the first capacitor unit in a first current flow direction and to the second capacitor unit in a second current flow direction, the second current flow direction being opposite the first current flow direction.

In at least one embodiment, the first capacitor unit and second capacitor unit are aligned on either side of the busbar system.

In at least one embodiment, the first capacitor unit has a first capacitance value, the second capacitance unit has a second capacitance value, and the first capacitance value is equal to the second capacitance value.

In at least one embodiment, the first capacitor unit is a first single capacitor and the second capacitor unit is a second single capacitor.

In at least one embodiment, the voltage conversion circuit is one of an alternating current (AC) to DC conversion circuit, a DC to AC conversion circuit, an AC to AC conversion circuit and a DC to DC conversion circuit.

In at least one embodiment, the first capacitor unit includes a first set of capacitors disposed on the first side of the busbar system; the second capacitor unit includes a second set of capacitors disposed on the second side of the busbar system; and a first number of capacitors in the first set of capacitors is the same as a second number of capacitors in the second set of capacitors.

In at least one embodiment, the first set of capacitors are arranged in a first row on the first side of the busbar system and the second set of capacitors are arranged in a second row on the second side of the busbar system.

In at least one embodiment, the first set of capacitors are arranged in a first plurality of adjacent rows on the first side of the busbar system and the second set of capacitors are arranged in a second plurality of adjacent rows on the second side of the busbar system.

In at least one embodiment, the first set of capacitors are arranged in a configuration with respect to the voltage conversion circuit on the first side of the busbar system.

In at least one embodiment, the first set of capacitors includes at least one capacitor having a third capacitance value and at least one capacitor having a fourth capacitance value and the second set of capacitors include at least one capacitor having the third capacitance value and at least one capacitor having the fourth capacitance value.

In at least one embodiment, the voltage conversion system includes a housing, wherein the voltage conversion circuit and a capacitor system are disposed within the housing; and a composite resin disposed within the housing to mechanically position the capacitor system with respect to the voltage conversion circuit within the housing and to electrically insulate the voltage conversion circuit from the capacitor system.

A vehicle including a voltage conversion system including a double-sided direct current (DC)-link capacitor system includes a voltage conversion circuit and a double-sided DC-link capacitor system electrically coupled to the voltage conversion circuit. The double-sided DC-link capacitor system includes a busbar system; a first capacitor unit disposed on a first side of the busbar system and electrically coupled to the busbar system; and a second capacitor unit disposed on a second side of the busbar system and electrically coupled to the busbar system, the second side of the busbar system being opposite the first side of the busbar system, wherein a current flow through the busbar system flows to the first capacitor unit in a first current flow direction and to the second capacitor unit in a second current flow direction, the second current flow direction being opposite the first current flow direction.

In at least one embodiment, the first capacitor unit and second capacitor unit are aligned on either side of the busbar system.

In at least one embodiment, the first capacitor unit has a first capacitance value, the second capacitance unit has a second capacitance value, and the first capacitance value is equal to the second capacitance value.

In at least one embodiment, the first capacitor unit is a first single capacitor and the second capacitor unit is a second single capacitor.

In at least one embodiment, the voltage conversion circuit is one of an alternating current (AC) to DC conversion circuit, a DC to AC conversion circuit, an AC to AC conversion circuit and a DC to DC conversion circuit.

In at least one embodiment, the first capacitor unit includes a first set of capacitors disposed on the first side of the busbar system; the second capacitor unit includes a second set of capacitors disposed on the second side of the busbar system; and a first number of capacitors in the first set of capacitors is the same as a second number of capacitors in the second set of capacitors.

In at least one embodiment, the first set of capacitors are arranged in a first row on the first side of the busbar system and the second set of capacitors are arranged in a second row on the second side of the busbar system.

In at least one embodiment, the first set of capacitors are arranged in a c-configuration with respect to the voltage conversion circuit on the first side of the busbar system and the second set of capacitors are arranged in the c-configuration with respect to the voltage conversion circuit on the second side of the busbar system.

A double-sided direct current (DC)-link capacitor system includes a busbar system; a first capacitor unit disposed on a first side of the busbar system and electrically coupled to the busbar system; and a second capacitor unit disposed on a second side of the busbar system and electrically coupled to the busbar system, the second side of the busbar system being opposite the first side of the busbar system, wherein a current flow through the busbar system flows to the first capacitor unit in a first current flow direction and to the second capacitor unit in a second current flow direction, the second current flow direction being opposite the first current flow direction.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
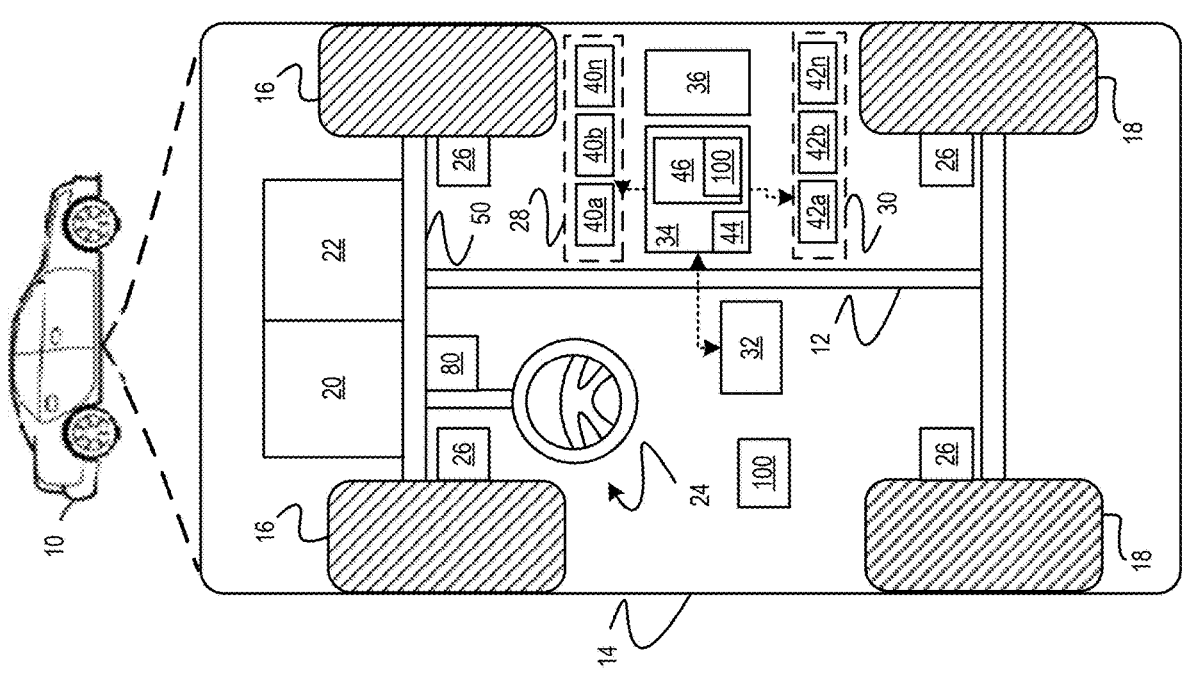
FIG. 1 is a functional block diagram of a vehicle including a voltage conversion system in accordance with at least one embodiment.

Referring to FIG. 1, a functional block diagram of a vehicle 10 including a voltage conversion system 100 is shown. The vehicle 10 includes one or more voltage conversion systems 100. One or more of the voltage conversion systems 100 includes a double-sided direct current (DC)-link capacitor system operable to mitigate parasitic inductance. The vehicle 10 generally includes a chassis 12, a body 14, front wheels 16, and rear wheels 18. While the vehicle 10 is depicted in the illustrated embodiment as a passenger car, the vehicle 10 may be other types of vehicles including trucks, sport utility vehicles (SUVs), and recreational vehicles (RVs). In various embodiments, the body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous or semi-autonomous vehicle that is automatically controlled to carry passengers and/or cargo from one place to another. For example, in an exemplary embodiment, the vehicle 10 is a so-called Level Two, Level Three, Level Four or Level Five automation system. Level two automation means the vehicle assists the driver in various driving tasks with driver supervision. Level three automation means the vehicle can take over all driving functions under certain circumstances. All major functions are automated, including braking, steering, and acceleration. At this level, the driver can fully disengage until the vehicle tells the driver otherwise. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the vehicle 10 generally includes a propulsion system 20 a transmission system 22, a steering system 24, a braking system 26, a sensor system 28, an actuator system 30, at least one data storage device 32, at least one controller 34, and a communication system 36. The controller 34 is configured to implement an automated driving system (ADS). The propulsion system 20 is configured to generate power to propel the vehicle. The propulsion system 20 may, in various embodiments, include an internal combustion engine, an electric machine such as a traction motor, a fuel cell propulsion system, and/or any other type of propulsion configuration. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The braking system 26 is configured to provide braking torque to the vehicle wheels 16-18. The braking system 26 may, in various embodiments, include friction brakes, brake by wire, a regenerative braking system such as an electric machine, and/or other appropriate braking systems.

The steering system 24 is configured to influence a position of the of the vehicle wheels 16. While depicted as including a steering wheel and steering column, for illustrative purposes, in some embodiments contemplated within the scope of the present disclosure, the steering system 24 may not include a steering wheel and/or steering column. The steering system 24 includes a steering column coupled to an axle 50 associated with the front wheels 16 through, for example, a rack and pinion or other mechanism (not shown). Alternatively, the steering system 24 may include a steer by wire system that includes actuators associated with each of the front wheels 16.

The sensor system 28 includes one or more sensing devices 40a-40n that sense observable conditions of the exterior environment and/or the interior environment of the vehicle 10. The sensing devices 40a-40n can include, but are not limited to, radars, lidars, global positioning systems, optical cameras, thermal cameras, ultrasonic sensors, and/or other sensors. In various embodiments, the sensor system 28 includes a biometric sensor system configured to sense occupant biometric data of one or more occupants of the vehicle 10. In various embodiments, the sensor system 28 includes a vehicle environment sensor system configured to sense vehicle environmental data.

The vehicle dynamics sensors provide vehicle dynamics data including longitudinal speed, yaw rate, lateral acceleration, longitudinal acceleration, etc. The vehicle dynamics sensors may include wheel sensors that measure information pertaining to one or more wheels of the vehicle 10. In one embodiment, the wheel sensors comprise wheel speed sensors that are coupled to each of the wheels 16-18 of the vehicle 10. Further, the vehicle dynamics sensors may include one or more accelerometers (provided as part of an Inertial Measurement Unit (IMU)) that measure information pertaining to an acceleration of the vehicle 10. In various embodiments, the accelerometers measure one or more acceleration values for the vehicle 10, including latitudinal and longitudinal acceleration and yaw rate.

The actuator system 30 includes one or more actuator devices 42a-42n that control one or more vehicle features such as, but not limited to, the propulsion system 20, the transmission system 22, the steering system 24, and the braking system 26. In various embodiments, the vehicle features can further include interior and/or exterior vehicle features such as, but are not limited to, doors, a trunk, and cabin features such as air, music, lighting, etc. (not numbered).

The communication system 36 is configured to wirelessly communicate information to and from other entities 48, such as but not limited to, other vehicles ("V2V" communication,) infrastructure ("V2I" communication), remote systems, and/or personal devices. In an exemplary embodiment, the communication system 36 is a wireless communication system configured to communicate via a wireless local area network (WLAN) using IEEE 802.11 standards or by using cellular data communication. However, additional, or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in the ADS of the vehicle 10. In various embodiments, the data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals to the actuator system 30 to automatically control the components of the vehicle 10 based on the logic, calculations, methods, and/or algorithms. Although only one controller 34 is shown in FIG. 1, embodiments of the vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In various embodiments, the controller(s) 34 are configured to implement ADS.

Figure 2A:
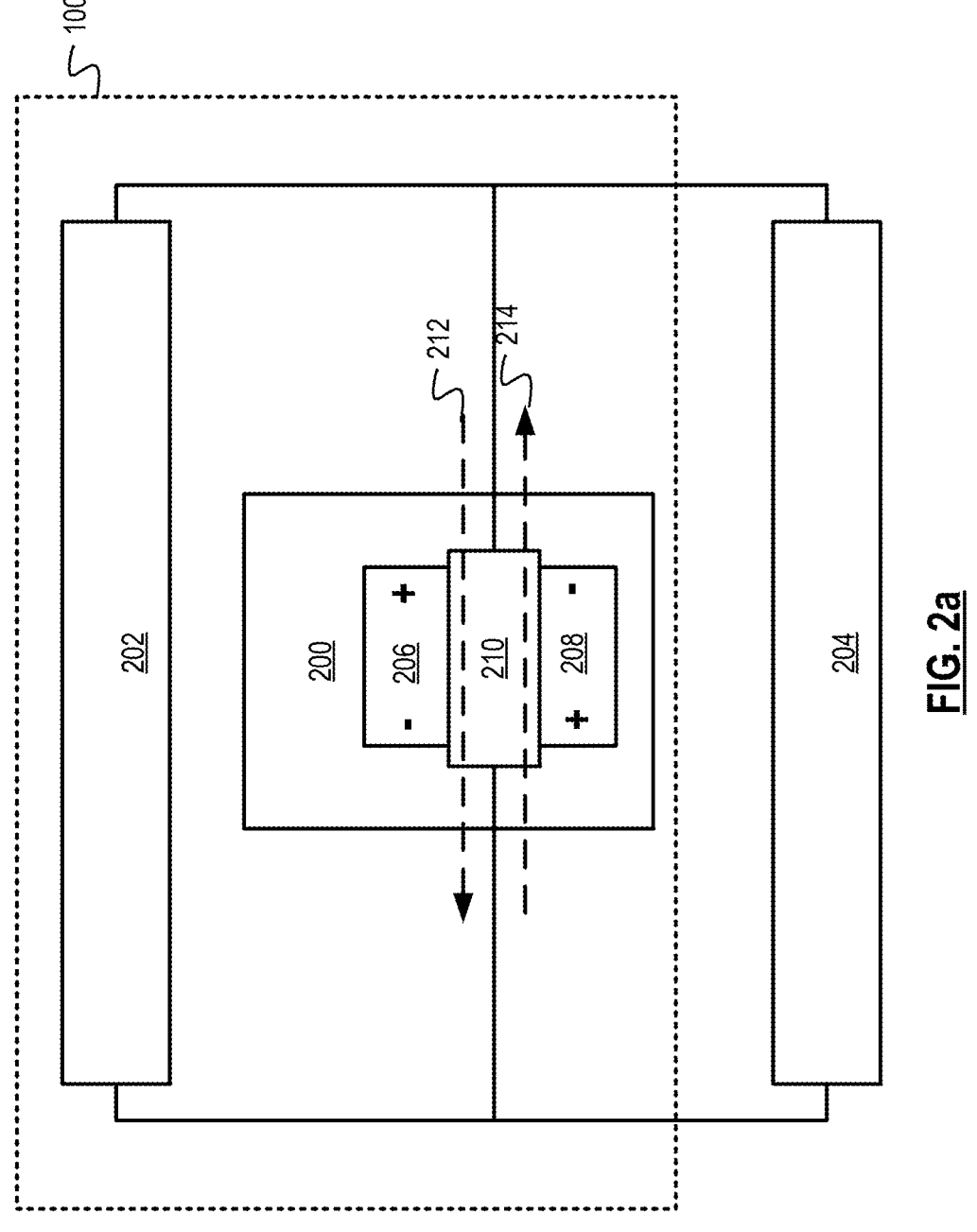
FIG. 2a is a functional block diagram of a voltage conversion system including a double-sided DC-link capacitor system in accordance with at least one embodiment.

Referring to FIG. 2a, a functional block diagram of a voltage conversion system 100 including a double-sided DC-link capacitor system 200 in accordance with at least one embodiment is shown. The voltage conversion system 100 includes a voltage conversion circuit 202 and the double-sided DC-link capacitor system 200. In at least one embodiment, the voltage conversion circuit 202 is configured to be electrically coupled to a current source 204. In at least one embodiment, the voltage conversion circuit 202 is configured to be electrically coupled to a voltage source 204. Examples of voltage conversion circuits 202 include, but are not limited to, an alternative current (AC) to DC conversion circuit, a DC to AC conversion circuit, an AC to AC conversion circuit, and a DC to DC conversion circuit. In at least one embodiment, the voltage conversion circuit 202 may be positioned on a busbar system 210

The double-sided DC-link capacitor system 200 includes a first capacitor unit 206, a second capacitor unit 208, and the busbar system 210. The first capacitor unit 206 and the second capacitance unit 208 have the same capacitance values or close capacitance values. The first capacitor unit 206 is disposed on a first side of the busbar system 210. The second capacitor unit 208 is disposed on a second side of the busbar system 210. The first and second sides of the busbar system 210 are opposing sides of the busbar system 210. The first capacitor unit 206 on the first side of the busbar system 210 is aligned with the second capacitor unit 208 on the second side of the busbar system 210. The busbar system 210 is electrically coupled to the first capacitor unit 206, the second capacitor unit 208, and the voltage conversion circuit 202.

A current flow through the busbar system 210 flows to the first capacitor unit 206 in a first current flow direction 212 and to the second capacitor unit 208 in a second current flow direction 214. The second current flow direction 214 is opposite the first current flow direction 212. In at least one embodiment, the current flow is an AC current flow so the first current flow direction 212 and the second current flow direction 214 changes in accordance with the AC current flow. The second current flow direction 214 is always opposite the first current flow direction 212. In at least one embodiment, the first and second capacitor units 206, 208 are polarized capacitors. In at least one embodiment, the first and second capacitor units 206, 208 are unpolarized capacitors.

The current generated by the source 204 or the voltage conversion circuit 202 flows through the busbar system 210 to the first capacitor unit 206 in the first current flow direction 212 and to the second capacitor unit 208 in the second current flow direction 214. The source 204 is one of a constant voltage source and a current source. There is no current flow from the source 204 after the first and second capacitor units 206, 208 are fully charged. However, the voltage conversion circuit 202 generates an AC ripple current when it performs a conversion. The AC ripple current will continuously flow through the double-sided DC-link capacitor system 200. The main function of the double-sided DC-link capacitor system 200 is to filter the AC ripple current.

The current flowing to the first capacitor unit 206 in the first current flow direction 212 generates a first electromagnetic field. The direction of the first magnetic field is perpendicular to the busbar system 210 and curls around the busbar system 210 in a circular pattern in a first circular direction. The current flowing to the second capacitor unit 208 in the second current flow direction 214 generates a second electromagnetic field. The direction of the second electromagnetic field is perpendicular to the busbar system 210 and curls around the busbar system 210 in a circular pattern in a second circular direction. The first circular direction of the first electromagnetic field is opposite the second circular direction of the second electromagnetic field.

Since the first capacitor unit 206 has the same capacitance value as the second capacitor unit 208, the first and second electromagnetic fields have the same electromagnetic field strengths. The opposing circular directions of the first and second electromagnetic fields causes the first electromagnetic field to cancel the second electromagnetic field. The cancellation of the first and second electromagnetic fields minimizes parasitic inductance produced by the flow of current to the first and second capacitor units 206, 208. In addition, the relatively smaller busbar system 210 used in a double-sided DC-link capacitor system 200 compared to a busbar system used in a single-sided DC-link capacitor system results in a smaller current commutation loop, leading to lower parasitic inductance in the double-sided DC-link capacitor system 200.

Figure 2B:
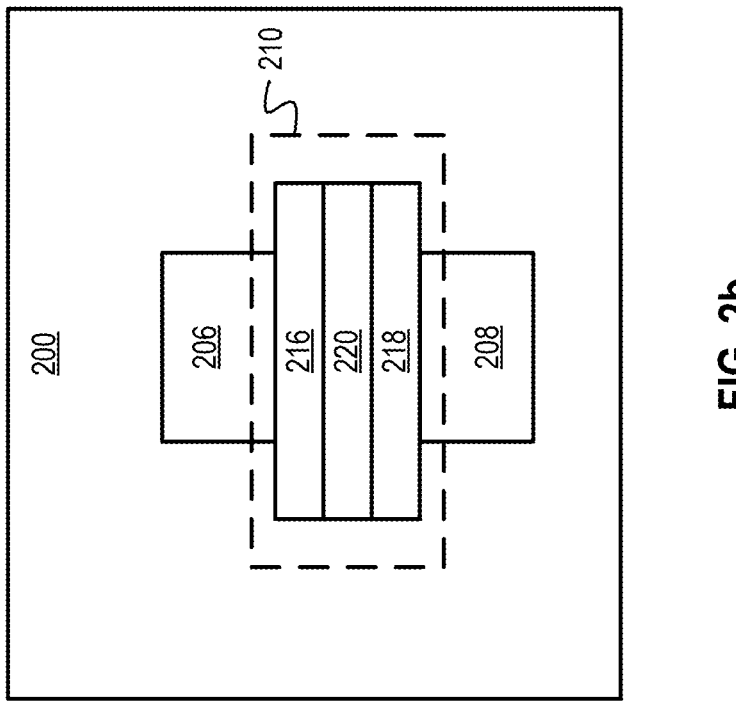
FIG. 2b is a functional block diagram of a double-sided direct current (DC)-link capacitor system in accordance with at least one embodiment.

Referring to FIG. 2b, a functional block diagram of a double-sided DC-link capacitor system 200 in accordance with at least one embodiment is shown. The double-sided DC-link capacitor system 200 includes a first capacitor unit 206, a second capacitor unit 208, and a busbar system 210. The busbar system 210 includes a top busbar 216 and a bottom busbar 218. An insulation layer 220 is disposed between the top busbar 216 and the bottom busbar 218.

In at least one embodiment, the top busbar 216 is electrically coupled to a $+V_{DC}$ voltage via a $+V_{DC}$ busbar terminal and the bottom busbar 218 is electrically coupled to a $-V_{DC}$ voltage via a $-V_{DC}$ busbar terminal. In at least one embodiment, the top busbar 216 is electrically coupled to a $-V_{DC}$ voltage via a $-V_{DC}$ busbar terminal and the bottom busbar 218 is electrically coupled to a $+V_{DC}$ voltage via a $+V_{DC}$ busbar terminal. The $+V_{DC}$ busbar terminal and the $-V_{DC}$ busbar terminal are electrically coupled to the voltage conversion circuit 202 and to the source 204. The source 204 is one of a voltage source and a current source. In at least one embodiment, the first and second capacitor units 206, 208 are installed and electrically coupled to the busbar system 210 by plug-in via brass terminals. In at least one embodiment, the first and second capacitor units 206, 208 are installed and electrically coupled to the busbar system 210 by soldering the first and second capacitor units 206, 208 to the busbar system 210.

Figure 2C:
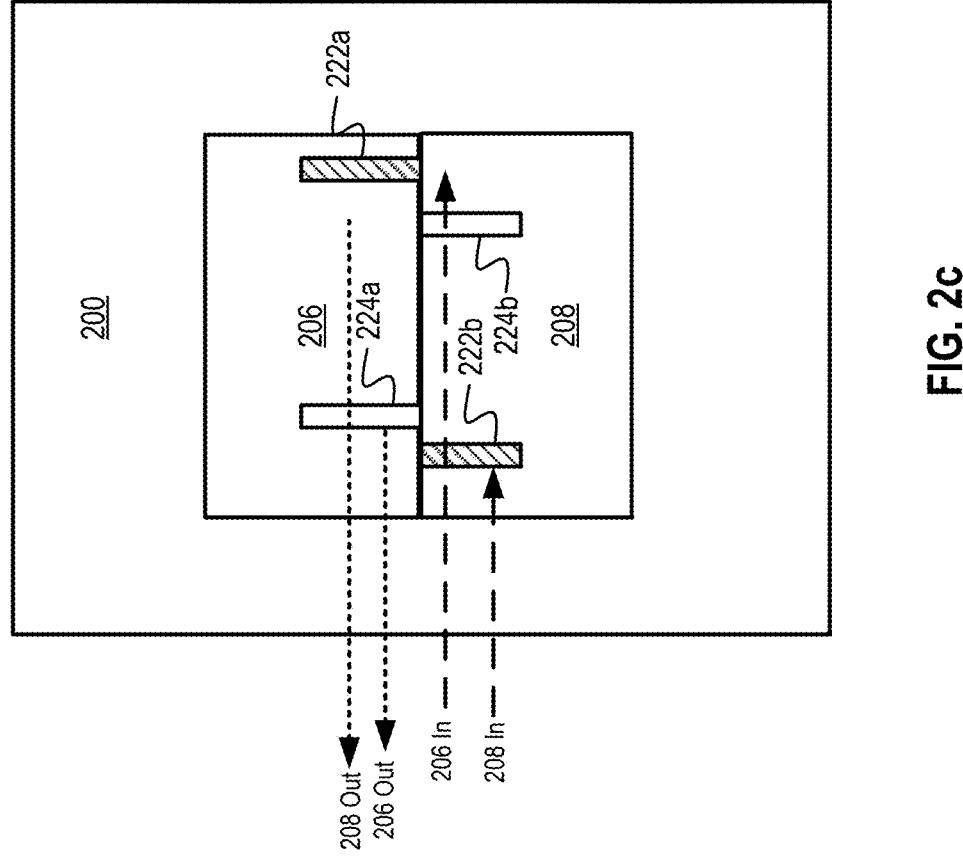
FIG. 2c is a functional block diagram of an exemplary double-sided DC-link capacitor system illustrating electrical coupling of first and second capacitor units to a busbar system in accordance with at least one embodiment.

Referring to FIG. 2c, a functional block diagram of an exemplary double-sided DC-link capacitor system 200 illustrating electrical coupling of first and second capacitor units 206, 208 to a busbar system 210 in accordance with at least one embodiment is shown. The exemplary first and second capacitor units 206, 208 are shown as including a single capacitor, however when the first and second capacitor units 206, 208 includes more than one capacitor, each of the capacitors is electrically coupled to the busbar system 210 in a similar manner.

The busbar system 210 includes a top busbar 216 and a bottom busbar 218. The top busbar 216 is electrically coupled to a $+V_{DC}$ voltage via a $+V_{DC}$ busbar terminal and the bottom busbar 218 is electrically coupled to a $-V_{DC}$ voltage via a $-V_{DC}$ voltage terminal.

The capacitor in the first capacitor unit 206 is electrically coupled to a $+V_{DC}$ capacitor terminal 222a and a $-V_{DC}$ capacitor terminal 224a. The capacitor in the second capacitor unit 208 is electrically coupled to a $+V_{DC}$ capacitor terminal 222b and a $-V_{DC}$ capacitor terminal 224b. The $+V_{DC}$ capacitor terminals 222a, 222b are electrically coupled to the top busbar 216. The $-V_{DC}$ capacitor terminals 224a, 224b are electrically coupled to the bottom busbar 218. In at least embodiment, the $+V_{DC}$ capacitor terminals 222a, 222b are integrated with the top busbar 216 and the $-V_{DC}$ capacitor terminals 222a, 222b are integrated with the bottom busbar 218.

In at least one embodiment, the capacitor in the first capacitor unit 206 is electrically coupled to the $+V_{DC}$ capacitor terminal 222a and the $-V_{DC}$ capacitor terminal 224a by plug-in via brass terminals. In at least one embodiment, the capacitor in the first capacitor unit 206 is electrically coupled to the $+V_{DC}$ capacitor terminal 222a and the $-V_{DC}$ capacitor terminal 224a by soldering the capacitor in the first capacitor unit 206 to the $+V_{DC}$ capacitor terminal 222a and the $-V_{DC}$ capacitor terminal 224a.

In at least one embodiment, the capacitor in the second capacitor unit 208 is electrically coupled to the $+V_{DC}$ capacitor terminal 222b and the $-V_{DC}$ capacitor terminal 224b by plug-in via brass terminals. In at least one embodiment, the capacitor in the second capacitor unit 208 is electrically coupled to the $+V_{DC}$ capacitor terminal 222b and the $-V_{DC}$ capacitor terminal 224b by soldering the capacitor in the second capacitor unit 208 to the $+V_{DC}$ capacitor terminal 222b and the $-V_{DC}$ capacitor terminal 224b.

The illustrated electrical coupling of the first capacitor unit 206 and the second capacitor unit 208 results in a first current flow having a first current flow direction 212 flowing to the capacitor in the first capacitor unit 206 via the $+V_{DC}$ capacitor terminal 222a and flowing out via the $-V_{DC}$ capacitor terminal 224a and in a second current flow having a second current flow direction 214 flowing to the capacitor in the second capacitor unit 208 via the $+V_{DC}$ capacitor terminal 222b and flowing out via the $-V_{DC}$ capacitor terminal 224b. In at least one embodiment, the current flow is an AC current flow so the first current flow direction 212 and the second current flow direction 214 changes in accordance with the AC current flow. The second current flow direction 214 is always opposite the first current flow direction 212.

Figure 3:
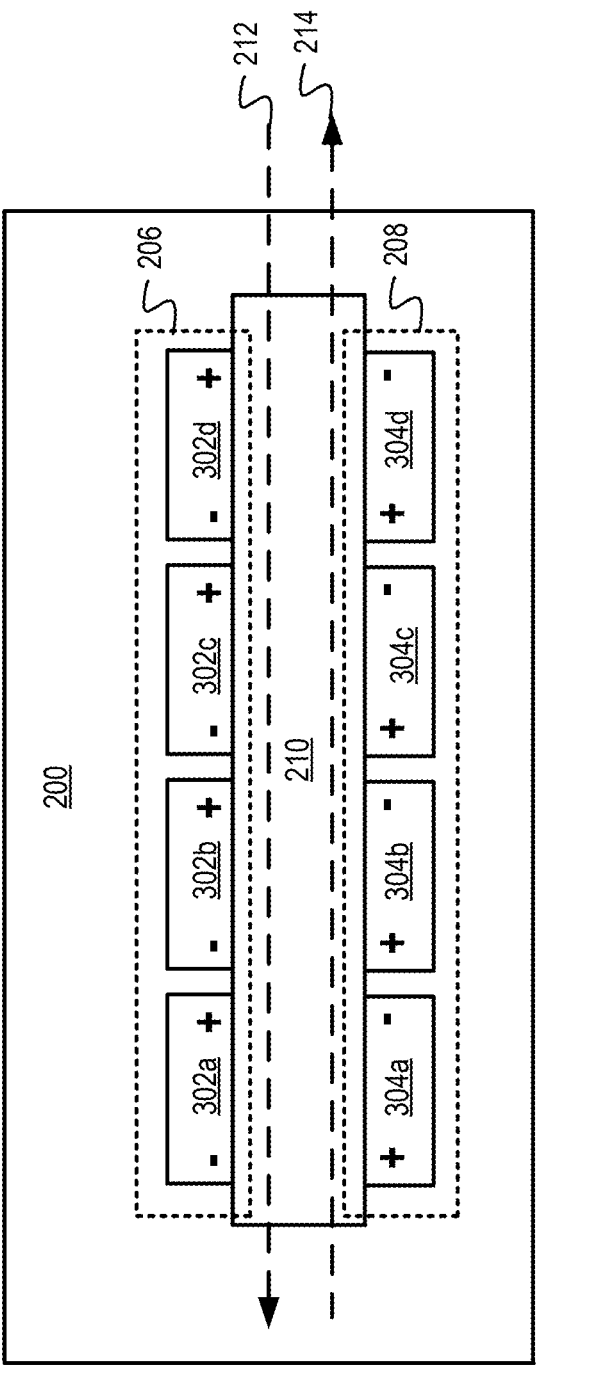
FIG. 3 is a functional block diagram of a double-sided DC-link capacitor system including first and capacitor units including rows of capacitors disposed on either side of a busbar system in accordance with at least one embodiment.

Referring to FIG. 3, a functional block diagram of a double-sided DC-link capacitor system 200 including first and second capacitor units 206, 208 including rows of capacitors disposed on either side of a busbar system 210 in accordance with at least one embodiment is shown. The double-sided DC-link capacitor system 200 includes the first capacitor unit 206 and the second capacitor unit 208 disposed on opposing sides of the busbar system 210. In at least one embodiment, the voltage conversion circuit 202 may be positioned on the busbar system 210

The first capacitor unit 206 includes a first set of capacitors 302a, 302b, 302c, 302d arranged in a first row on a first side of the busbar system 210. The first set of capacitors 302a, 302b, 302c, 302d are arranged on the first side of the busbar system 210 with the current flow direction of each of the capacitors 302a, 302b, 302c, 302d in a first current flow direction 212. The second capacitor unit 208 includes a second set of capacitors 304a, 304b, 304c, 304d arranged in a second row on a second side of the busbar system 210. The second set of capacitors 304a, 304b, 304c, 304d are arranged on the second side of the busbar system 210 with the current flow direction of each of the capacitors 304a, 304b, 304c, 304d in a second current flow direction 214 that is opposite the first current flow direction 212. In at least one embodiment, the current flow is an AC current flow so the first current flow direction 212 and the second current flow direction 214 changes in accordance with the AC current flow. The second current flow direction 214 is always opposite the first current flow direction 212.

The first and second sides of the busbar system 210 are opposing sides of the busbar system 210. The first set of capacitors 302a, 302b, 302c, 302d on the first side of the busbar system 210 are aligned with the second set of capacitors 304a, 304b, 304c, 304d on the second side of the busbar system 210. The busbar system 210 is electrically coupled to the first set of capacitors 302a, 302b, 302c, 302d, the second set of capacitors 304a, 304b, 304c, 304d, the voltage conversion circuit 202, and the source 204.

In at least one embodiment, a number of capacitors in the first set of capacitors 302a, 302b, 302c, 302d is the same as the number of capacitors in the second set of capacitors 304a, 304b, 304c, 304d. In at least one embodiment, the number of capacitors in the first set of capacitors 302a, 302b, 302c, 302d is not the same as the number of capacitors in the second set of capacitors 304a, 304b, 304c, 304d. The aggregate capacitance value of the first set of capacitors 302a, 302b, 302c, 302d is equal to the aggregate capacitance value of the second set of capacitors 304a, 304b, 304c, 304d. The busbar system 210 includes a top busbar 216 and a bottom busbar 218. The total length of the top busbar 216 is equal to the total length of the bottom busbar 218.

Current flowing to the first set of capacitors 302a, 302b, 302c, 302d in the first capacitor unit 206 in the first current flow direction 212 generates a first electromagnetic field. The direction of the first magnetic field is perpendicular to the busbar system 210 and curls around the busbar system 210 in a circular pattern in a first circular direction. Current flowing to the second set of capacitors 304a, 304b, 304c, 304d in the second capacitor unit 208 in the second current flow direction 214 generates a second electromagnetic field. The direction of the second electromagnetic field is perpendicular to the busbar system 210 and curls around the busbar system 210 in a circular pattern in a second circular direction. The first circular direction of the first electromagnetic field is opposite the second circular direction of the second electromagnetic field.

Since the aggregate capacitance value of the first set of capacitors 302a, 302b, 302c, 302d is equal to the aggregate capacitance value of the second set of capacitors 304a, 304b, 304c, 304d, the first and second electromagnetic fields have the same electromagnetic field strengths. The opposing circular directions of the first and second electromagnetic fields causes the first electromagnetic field to cancel the second electromagnetic field. The cancellation of the first and second electromagnetic fields minimizes parasitic inductance produced by the flow of current to the first set of capacitors 302a, 302b, 302c, 302d and the second set of capacitors 304a, 304b, 304c, 304d.

While the first capacitor unit 206 is shown as including four capacitors in the first set of capacitors 302a, 302b, 302c, 302d and the second capacitor unit 208 is shown as including four capacitors in the second set of capacitors 304a, 304b, 304c, 304d, in alternative embodiments, the first and second set of capacitors may include a greater or fewer number of capacitors. In at least one embodiment, the first capacitor unit 206 includes a single capacitor and the second capacitor unit 208 includes a single capacitor.

Figure 4:
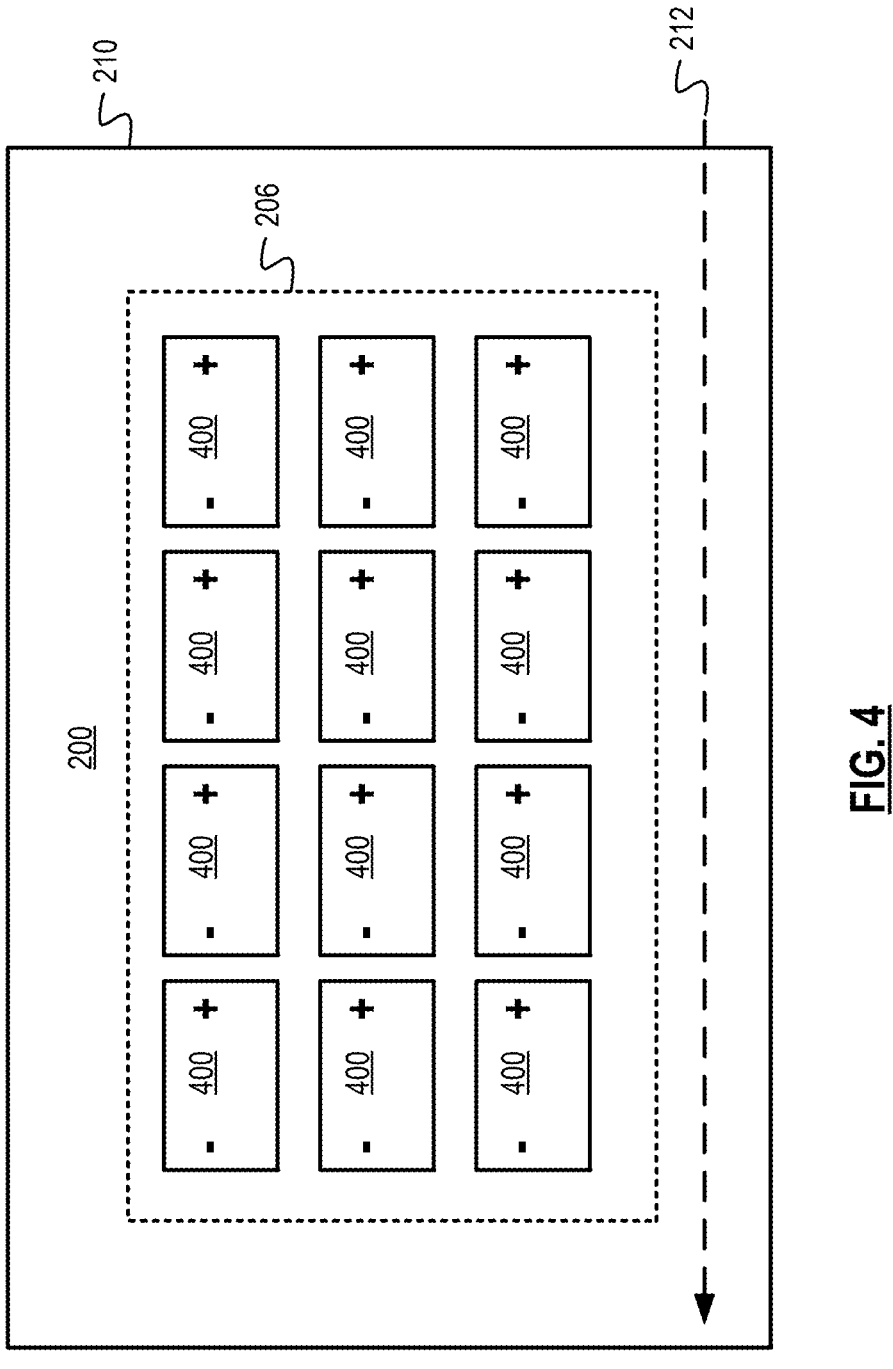
FIG. 4 is a top view of a functional block diagram of a double-sided DC-link capacitor system including multiple capacitors arranged in adjacent rows on either side of a busbar system in accordance with at least one embodiment.

Referring to FIG. 4 a top view of a functional block diagram of a double-sided DC-link capacitor system 200 including multiple capacitors 400 arranged in adjacent rows on either side of a busbar system 210 in accordance with at least one embodiment is shown. In at least one embodiment, the voltage conversion circuit 202 may be positioned on the busbar system 210. The double-sided DC-link capacitor system 200 includes a first capacitor unit 206 and a second capacitor unit 208 (not shown) disposed on opposing sides of the busbar system 210.

The first capacitor unit 206 includes a first set of capacitors 400 arranged in adjacent rows on a first side of the busbar system 210 with the current flow direction of each of the capacitors 400 in a first current flow direction 212. The second capacitor unit 208 (not shown) includes a second set of capacitors arranged in adjacent rows on a second side of the busbar system 210 with the current flow direction of each of the capacitors in the second set of capacitors in a second current flow direction 214 that is opposite the first current flow direction 212. In at least one embodiment, the current flow is an AC current flow so the first current flow direction 212 and the second current flow direction 214 changes in accordance with the AC current flow. The second current flow direction 214 is always opposite the first current flow direction 212.

The first and second sides of the busbar system 210 are opposing sides of the busbar system 210. The first set of capacitors 400 arranged in adjacent rows on the first side of the busbar system 210 are aligned with the second set of capacitors arranged in adjacent rows on the second side of the busbar system 210. The busbar system 210 is electrically coupled to the first set of capacitors 400, the second set of capacitors, the voltage conversion circuit 202, and the source 204.

In at least one embodiment, a number of capacitors in the first set of capacitors 400 is the same as the number of capacitors in the second set of capacitors. In at least one embodiment, the number of capacitors in the first set of capacitors 400 is not the same as the number of capacitors in the second set of capacitors. The aggregate capacitance value of the first set of capacitors 400 is equal to the aggregate capacitance value of the second set of capacitors. The busbar system 210 includes a top busbar 216 and a bottom busbar 218. The total length of the top busbar 216 is equal to the total length of the bottom busbar 218.

Current flowing to the first set of capacitors 400 in the first capacitor unit 206 in the first current flow direction 212 generates a first electromagnetic field. The direction of the first magnetic field is perpendicular to the busbar system 210 and curls around the busbar system 210 in a circular pattern in a first circular direction. Current flowing to the second set of capacitors in the second capacitor unit in the second current flow direction 214 generates a second electromagnetic field. The direction of the second electromagnetic field is perpendicular to the busbar system 210 and curls around the busbar system 210 in a circular pattern in a second circular direction. The first circular direction of the first electromagnetic field is opposite the second circular direction of the second electromagnetic field.

Since the aggregate capacitance value of the first set of capacitors 400 is equal to the aggregate capacitance value of the second set of capacitors, the first and second electromagnetic fields have the same electromagnetic field strengths. The opposing circular directions of the first and second electromagnetic fields causes the first electromagnetic field to cancel the second electromagnetic field. The cancellation of the first and second electromagnetic fields minimizes parasitic inductance produced by the flow of current to the first set of capacitors 400 and the second set of capacitors.

While the first capacitor unit 206 is shown as including twelve capacitors in the first set of capacitors 400, in alternative embodiments, the first and second set of capacitors may include a greater or fewer number of capacitors.

Figures 5, 6:
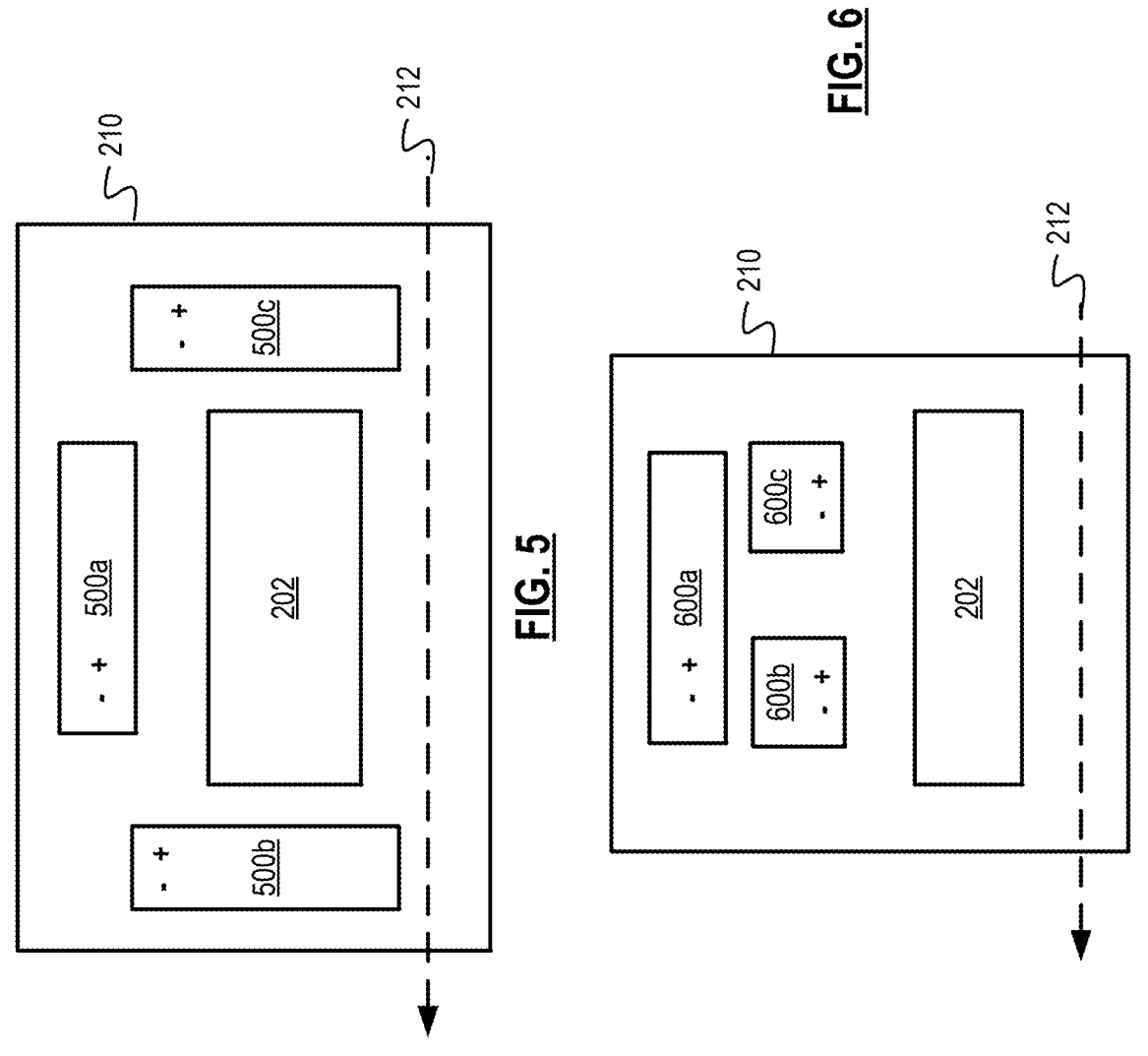
FIG. 5 is a top view of a functional block diagram of a double-sided DC-link capacitor system including multiple of capacitors arranged in a c-configuration with respect to a voltage conversion circuit on either side of a busbar system in accordance with at least one embodiment.
FIG. 6 is a top view of a functional block diagram of a double-sided DC-link capacitor system including multiple capacitors having different capacitance values arranged in a configuration with respect to a voltage conversion circuit on either side of a busbar system in accordance with at least one embodiment.

Referring to FIG. 5, a top view of a functional block diagram of a double-sided DC-link capacitor system 200 including multiple of capacitors 500a, 500b, 500c arranged in a c-configuration with respect to a voltage conversion circuit 202 on either side of a busbar system 210 in accordance with at least one embodiment is shown. In at least one embodiment, the voltage conversion circuit 202 may be positioned on the busbar system 210. The double-sided DC-link capacitor system 200 includes a first capacitor unit 206 and a second capacitor unit 208 (not shown) disposed on opposing sides of the busbar system 210.

The first capacitor unit 206 includes a first set of capacitors 500a, 500b, 500c arranged in c-configuration with respect to the voltage conversion circuit 202 on a first side of the busbar system 210 with the current flow direction of each of the capacitors 500a, 500b, 500c in a first current flow direction 212. The second capacitor unit 206 (not shown) includes a second set of capacitors arranged in c-configuration with respect to the voltage conversion circuit 202 on a second side of the busbar system 210 with the current flow direction of each of the capacitors in a second current flow direction 214 that is opposite the first current flow direction 212. In at least one embodiment, the current flow is an AC current flow so the first current flow direction 212 and the second current flow direction 214 changes in accordance with the AC current flow. The second current flow direction 214 is always opposite the first current flow direction 212.

The first and second sides of the busbar system 210 are opposing sides of the busbar system 210. Each of the capacitors in the first set of capacitors 500a, 500b, 500c arranged in the c-configuration on the first side of the busbar system 210 are aligned with a corresponding capacitor in the second set of capacitors arranged in the c-configuration on the second side of the busbar system 210. Each of the capacitors in the first set of capacitors 500a, 500b, 500c arranged in the c-configuration on the first side of the busbar system 210 has the same capacitance value as the corresponding capacitor in the second set of capacitors arranged in the c-configuration on the second side of the busbar system 210 system. The busbar system 210 is electrically coupled to the first set of capacitors 500a, 500b, 500c, the second set of capacitors, the voltage conversion circuit 202, and the source 204.

In at least one embodiment, the capacitors in the first set of capacitors 500a, 500b, 500c and the capacitors in the second set of capacitors all have the same capacitance value. In at least one embodiment, individual capacitors in the first set of capacitors 500a, 500b, 500c may have different capacitance values and individual capacitors in the second set of capacitors that correspond to a capacitor in the first set of capacitors 500a, 500b, 500c have the same capacitance value as the corresponding capacitor in the first set of capacitors 500a, 500b, 500c.

Current flowing to the first set of capacitors 500a, 500b, 500c in the first capacitor unit 206 in the first current flow direction 212 generates a first electromagnetic field. The direction of the first magnetic field is perpendicular to the busbar system 210 and curls around the busbar system 210 in a circular pattern in a first circular direction. Current flowing to the second set of capacitors in the second capacitor unit 208 in the second current flow direction 214 generates a second electromagnetic field. The direction of the second electromagnetic field is perpendicular to the busbar system 210 and curls around the busbar system 210 in a circular pattern in a second circular direction. The first circular direction of the first electromagnetic field is opposite the second circular direction of the second electromagnetic field.

Since the aggregate capacitance value of the first set of capacitors 500a, 500b, 500c is equal to the aggregate capacitance value of the second set of capacitors, the first and second electromagnetic fields have the same electromagnetic field strengths. The opposing circular directions of the first and second electromagnetic fields causes the first electromagnetic field to cancel the second electromagnetic field. The cancellation of the first and second electromagnetic fields minimizes parasitic inductance produced by the flow of current to the first set of capacitors 500a, 500b, 500c and second set of capacitors.

While the first capacitor unit 206 is shown as including three capacitors in the first set of capacitors 500a, 500b, 500c, in alternative embodiments, the first and second set of capacitors may include a greater or fewer number of capacitors. In at least one embodiment, the multiple capacitors arranged in the c-configuration may be a single-sided capacitor system. While a c-configuration has been described, in alternative embodiments, different configurations of the other configurations may be used.

Referring to FIG. 6, a top view of a functional block diagram of a double-sided DC-link capacitor system 200 including multiple capacitors 600a, 600b, 600c having different capacitance values arranged in a configuration with respect to a voltage conversion circuit 202 on either side of a busbar system 210 in accordance with at least one embodiment is shown. In at least one embodiment, the voltage conversion circuit 202 may be positioned on the busbar system 210. The double-sided DC-link capacitor system 200 includes a first capacitor unit 206 and a second capacitor unit 208 (not shown) disposed on opposing sides of the busbar system 210.

The first capacitor unit 206 includes a first set of capacitors 600a, 600b, 600c arranged in the configuration with respect to the voltage conversion circuit 202 on a first side of the busbar system 210 with the current flow direction of each of the capacitors 600a, 600b, 600c in a first current flow direction 212. The second capacitor unit 206 (not shown) includes a second set of capacitors arranged in the same configuration with respect to the voltage conversion circuit 202 on a second side of the busbar system 210 with the current flow direction of each of the capacitors in a second current flow direction 214 that is opposite the first current flow direction 212. In at least one embodiment, the current flow is an AC current flow so the first current flow direction 212 and the second current flow direction 214 changes in accordance with the AC current flow. The second current flow direction 214 is always opposite the first current flow direction 212.

The first and second sides of the busbar system 210 are opposing sides of the busbar system 210. Each of the capacitors in the first set of capacitors 600a, 600b, 600c arranged in the configuration on the first side of the busbar system 210 are aligned with a corresponding capacitor in the second set of capacitors arranged in the same configuration on the second side of the busbar system 210. Each of the capacitors in the first set of capacitors 600a, 600b, 600c arranged in the configuration on the first side of the busbar system 210 has the same capacitance value as the corresponding capacitor in the second set of capacitors arranged in the same configuration on the second side of the busbar system 210 system. The busbar system 210 is electrically coupled to the first set of capacitors 600a, 600b, 600c, the second set of capacitors, the voltage conversion circuit 202, and the source 204.

Individual capacitors in the first set of capacitors 600a, 600b, 600c may have different capacitance values and individual capacitors in the second set of capacitors that correspond to a capacitor in the first set of capacitors 600a, 600b, 600c have the same capacitance value. For example, the capacitor 600a may have a first capacitance value and the capacitors 600b, 600c may have a second capacitance value that is different from the first capacitance value.

Current flowing to the first set of capacitors 600a, 600b, 600c in the first capacitor unit 206 in the first current flow direction 212 generates a first electromagnetic field. The direction of the first magnetic field is perpendicular to the busbar system 210 and curls around the busbar system 210 in a circular pattern in a first circular direction. Current flowing to the second set of capacitors in the second capacitor unit 208 in the second current flow direction 214 generates a second electromagnetic field. The direction of the second electromagnetic field is perpendicular to the busbar system 210 and curls around the busbar system 210 in a circular pattern in a second circular direction. The first circular direction of the first electromagnetic field is opposite the second circular direction of the second electromagnetic field.

Since the aggregate capacitance value of the first set of capacitors 600a, 600b, 600c is equal to the aggregate capacitance value of the second set of capacitors, the first and second electromagnetic fields have the same electromagnetic field strengths. The opposing circular directions of the first and second electromagnetic fields causes the first electromagnetic field to cancel the second electromagnetic field. The cancellation of the first and second electromagnetic fields minimizes parasitic inductance produced by the flow of current to the first set of capacitors 600a, 600b, 600c and second set of capacitors. The capacitors 600b and 600c, being smaller in size and lower parasitic inductance, are placed closer to the voltage conversion circuit 202, to allow a smaller commutation loop with less loop inductance, reducing voltage and current overshoot, ringing and EMI.

While the first capacitor unit 206 is shown as including three capacitors in the first set of capacitors 600a, 600b, 600c, in alternative embodiments, the first and second set of capacitors may include a greater or fewer number of capacitors. In at least one embodiment, the multiple capacitors arranged in the configuration may be a single-sided capacitor system.

In at least one embodiment, the voltage conversion system 100 is enclosed in a housing. The voltage conversion circuit 202 and the double-sided DC-link capacitor system 200 are disposed within the housing. The voltage conversion circuit 202 and the double-sided DC-link capacitor system 200 are not enclosed in separate housings. A composite resin is disposed within the housing to mechanically position the voltage conversion circuit 202 with respect to the double-sided DC-link capacitor system 200 within the housing and to electrically insulate the voltage conversion circuit 202 from the double-sided DC-link capacitor system 200.

Figure 7:
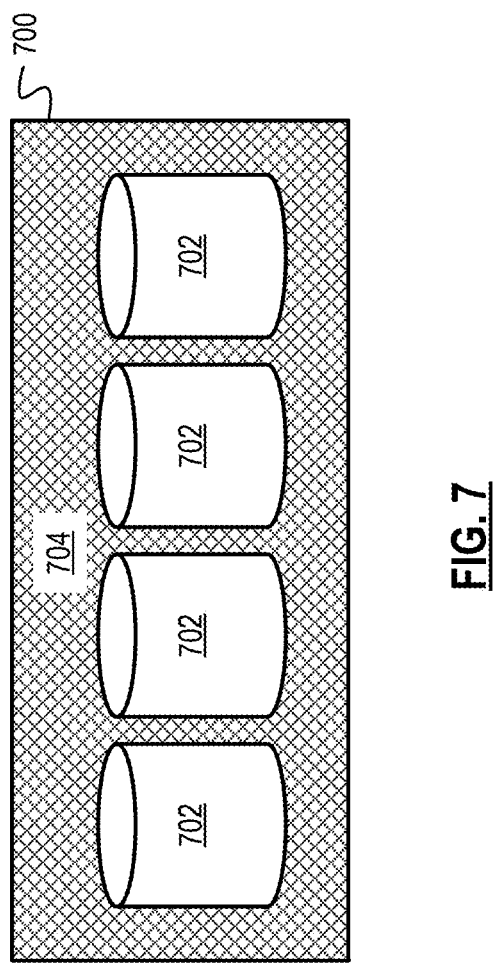
FIG. 7 is a functional block diagram illustrating use of a system casing as a capacitor casing in accordance with at least one embodiment.

Referring to FIG. 7, a functional block diagram illustrating use of a system casing 700 (also referred to as a housing) as a capacitor casing in accordance with at least one embodiment is shown. The one or more capacitors in the first and second capacitor units 206, 208 may be capacitor bobbins 702. The system casing 700 is used as capacitor casing for the capacitor bobbins 702 by installing the capacitor bobbins 702 inside the system casing 700 using a composite molding process. The composite molding 704 provides cooling and high voltage isolation.

In at least one embodiment, each of the capacitor bobbins 702 are cores only without individual casings. In at least one embodiment, the capacitor bobbins 702 may be different shapes. In at least one embodiment, the capacitor bobbins 702 may be different sizes. In at least one embodiment, the capacitor bobbins 702 may be different numbers.

The use of the system casing 700 as a capacitor casing can be implemented in a double-sided DC-link capacitor system 200 or in a single-sided system. The system casing 700 can be metal, other materials or a combination of metal and other materials. The use of a system casing 700 may reduce size, weight, cost and improve thermal performance of the double-sided DC-link capacitor system 200 or the single-sided system.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A voltage conversion system including a double-sided direct current (DC)-link capacitor system comprises:
    a voltage conversion circuit; and
    the double-sided DC-link capacitor system electrically coupled to the voltage conversion circuit, the double-sided DC-link capacitor system comprising:
    a busbar system;
    a first capacitor unit comprising a first set of capacitors disposed on a first side of the busbar system and electrically coupled to the busbar system; and
    a second capacitor unit comprising a second set of capacitors disposed on a second side of the busbar system and electrically coupled to the busbar system, wherein:
        the second side of the busbar system is opposite the first side of the busbar system,
        a first number of capacitors in the first set of capacitors is the same as a second number of capacitors in the second set of capacitors,
        the first set of capacitors are arranged in a c-configuration with respect to the voltage conversion circuit on the first side of the busbar system and the second set of capacitors are arranged in the c-configuration with respect to the voltage conversion circuit on the second side of the busbar system, and
        a current flow through the busbar system flows to the first capacitor unit in a first current flow direction and to the second capacitor unit in a second current flow direction, the second current flow direction being opposite the first current flow direction.

2. The voltage conversion system of claim 1, wherein the first capacitor unit and second capacitor unit are aligned on either side of the busbar system.

3. The voltage conversion system of claim 1, wherein the first capacitor unit has a first capacitance value, the second capacitor unit has a second capacitance value, and the first capacitance value is equal to the second capacitance value.

4. The voltage conversion system of claim 1, wherein the voltage conversion circuit is one of an alternating current (AC) to DC conversion circuit, a DC to AC conversion circuit, an AC to AC conversion circuit and a DC to DC conversion circuit.

5. The voltage conversion system of claim 1, wherein the first set of capacitors includes at least one capacitor having a third capacitance value and at least one capacitor having a fourth capacitance value and the second set of capacitors include at least one capacitor having the third capacitance value and at least one capacitor having the fourth capacitance value.

6. The voltage conversion system of claim 1, further comprising:
    a housing, wherein the voltage conversion circuit and the double-sided DC-link capacitor system are disposed within the housing; and
    a composite resin disposed within the housing to mechanically position the double-sided DC-link capacitor system with respect to the voltage conversion circuit within the housing and to electrically insulate the voltage conversion circuit from the double-sided DC-link capacitor system.

7. A vehicle including a voltage conversion system including a double-sided direct current (DC)-link capacitor system comprising:
    a voltage conversion circuit; and
    the double-sided DC-link capacitor system electrically coupled to the voltage conversion circuit, the double-sided DC-link capacitor system comprising:
    a busbar system;
    a first capacitor unit comprising a first set of capacitors disposed on a first side of the busbar system and electrically coupled to the busbar system; and
    a second capacitor unit comprising a second set of capacitors disposed on a second side of the busbar system and electrically coupled to the busbar system, wherein:
        the second side of the busbar system is opposite the first side of the busbar system,
        a first number of capacitors in the first set of capacitors is the same as a second number of capacitors in the second set of capacitors,
        the first set of capacitors are arranged in a c-configuration with respect to the voltage conversion circuit on the first side of the busbar system and the second set of capacitors are arranged in the c-configuration with respect to the voltage conversion circuit on the second side of the busbar system, and

a current flow through the busbar system flows to the first capacitor unit in a first current flow direction and to the second capacitor unit in a second current flow direction, the second current flow direction being opposite the first current flow direction.

8. The vehicle of claim 7, wherein the first capacitor unit and second capacitor unit are aligned on either side of the busbar system.

9. The vehicle of claim 7, wherein the first capacitor unit has a first capacitance value, the second capacitor unit has a second capacitance value, and the first capacitance value is equal to the second capacitance value.

10. The vehicle of claim 7, wherein the voltage conversion circuit is one of an alternating current (AC) to DC conversion circuit, a DC to AC conversion circuit, an AC to AC conversion circuit and a DC to DC conversion circuit.

11. A double-sided direct current (DC)-link capacitor system comprising:

a busbar system;

a first capacitor unit comprising a first set of capacitors disposed on a first side of the busbar system and electrically coupled to the busbar system; and a second capacitor unit comprising a second set of capacitors, disposed on a second side of the busbar system and electrically coupled to the busbar system, wherein:

the second side of the busbar system is opposite the first side of the busbar system, a first number of capacitors in the first set of capacitors is the same as a second number of capacitors in the second set of capacitors, the first set of capacitors are arranged in a c-configuration with respect to a voltage conversion circuit on the first side of the busbar system and the second set of capacitors are arranged in the c-configuration with respect to the voltage conversion circuit on the second side of the busbar system, and a current flow through the busbar system flows to the first capacitor unit in a first current flow direction and to the second capacitor unit in a second current flow direction, the second current flow direction being opposite the first current flow direction.

12. The double-sided DC-link capacitor system of claim 11, wherein the first capacitor unit and second capacitor unit are aligned on either side of the busbar system.

13. The double-sided DC-link capacitor system of claim 11, wherein the first capacitor unit has a first capacitance value, the second capacitor unit has a second capacitance value, and the first capacitance value is equal to the second capacitance value.

14. The double-sided DC-link capacitor system of claim 11, wherein the voltage conversion circuit is an alternating current (AC) to DC conversion circuit.

15. The double-sided DC-link capacitor system of claim 11, wherein the voltage conversion circuit is a DC to AC conversion circuit.

16. The double-sided DC-link capacitor system of claim 11, wherein the voltage conversion circuit is an AC to AC conversion circuit.

17. The double-sided DC-link capacitor system of claim 11, wherein the voltage conversion circuit is a DC to DC conversion circuit.

18. The double-sided DC-link capacitor system of claim 11, wherein the first set of capacitors includes at least one capacitor having a third capacitance value and at least one capacitor having a fourth capacitance value and the second set of capacitors include at least one capacitor having the third capacitance value and at least one capacitor having the fourth capacitance value.

19. The double-sided DC-link capacitor system of claim 11, further comprising a housing, wherein the voltage conversion circuit and the double-sided DC-link capacitor system are disposed within the housing.

20. The double-sided DC-link capacitor system of claim 19, further comprising a composite resin disposed within the housing to mechanically position the double-sided DC-link capacitor system with respect to the voltage conversion circuit within the housing and to electrically insulate the voltage conversion circuit from the double-sided DC-link capacitor system.

* * * * *